United States Patent [19]

Sparks et al.

[11] Patent Number: 5,730,193
[45] Date of Patent: Mar. 24, 1998

[54] APPARATUS AND METHOD FOR CAPTURING HALOCARBON COMPOSITIONS FROM CONTAINERS

[75] Inventors: Donald P. Sparks, Maumee; Howard K. Thompson, Toledo; Guy William Lampe, Amelia, all of Ohio

[73] Assignee: FRC International, Inc., Holland, Ohio

[21] Appl. No.: 668,764

[22] Filed: Jun. 25, 1996

[51] Int. Cl.$^6$ ................................................ B65B 31/00
[52] U.S. Cl. ........................... 141/51; 141/4; 141/65; 141/329
[58] Field of Search .................... 141/51, 65, 329, 141/4, 8, 113, 330; 222/5, 80, 81, 83.5, 86, 87

[56] References Cited

U.S. PATENT DOCUMENTS

| | | | |
|---|---|---|---|
| 4,984,431 | 1/1991 | Mount et al. | 62/85 |
| 5,150,577 | 9/1992 | Mitchell et al. | 62/18 |
| 5,263,326 | 11/1993 | Block et al. | 62/18 |
| 5,327,735 | 7/1994 | Hatton | 62/292 |
| 5,427,157 | 6/1995 | Nickens | 141/65 |
| 5,441,088 | 8/1995 | O'Neill et al. | 141/65 |
| 5,546,995 | 8/1996 | Van Etten | 141/65 |
| 5,582,014 | 12/1996 | Lyon et al. | 62/606 |
| 5,613,533 | 3/1997 | Gold et al. | 141/65 |

Primary Examiner—David J. Walczak
Assistant Examiner—Timothy L. Maust
Attorney, Agent, or Firm—Brinks Hofer Gilson & Lione

[57] ABSTRACT

An apparatus and method for the removing halocarbon compositions from containers for recycling and reuse. The apparatus comprises a base, a support column pivotally attached to the base, a support plate capable of receiving and supporting the container, a clamping device slidably attached to the support column, a piercing device capable of forming an opening in the container, a tilting device capable of tilting the support column and the support plate, and a controller for controlling the clamping device, the piercing device and the tilting device. The method comprises the steps of positioning the container on the support plate, clamping the container and forming an opening in the container while the container is being clamped. The halocarbon compositions are removed through the opening formed in the container and are captured for recycling. The container may be weighed before and after capturing the halocarbon compositions to determine the amount of halocarbon compositions removed from the container for recycling.

19 Claims, 5 Drawing Sheets

APPARATUS AND METHOD FOR CAPTURING HALOCARBON COMPOSITIONS FROM CONTAINERS

BACKGROUND OF THE INVENTION

1. Field of the Invention

The invention relates in general to an apparatus and method for recapturing halocarbon compositions from containers, and in particular, to an apparatus and method for capturing halon from a portable fire extinguisher for recycling.

2. Related Art

Ozone is a naturally occurring gas found in the earth's atmosphere. At the outer edge of the atmosphere, there is a thin layer of ozone gas that is critical to life on earth by protecting us from the sun's harmful rays.

When certain chemicals used on earth escape into the atmosphere, they are broken down by solar radiation and release chlorine and bromine atoms which, in a chain reaction, destroy ozone molecules. This reaction occurs more frequently than natural ozone replenishment, resulting in a thinning of the ozone layer.

Atmospheric measurements indicate that the ozone layer is getting thinner, and that certain times of the year, an ozone "hole" appears over Antarctica. It is believed that this reduction is due to solar or volcanic activity, but most scientists believe that certain man-made chemicals are major contributors to the problem. These chemicals include the chlorofluorocarbons (CFCs) found in refrigerators, solvents, and blowing agents for foams, and the Halons used for fire fighting.

Halons are low-toxicity, chemically stable compounds that have been used for fire and explosion suppression throughout this century. Prior to 1900, carbon tetrachloride (Halon 104) was used for fire protection, even though its combustion by-products were lethal. Today, Halon 1211 (a liquid streaming agent) is used mainly in hand-held fire extinguishers and Halon 1301 (a gaseous agent) is used mainly in total flooding systems. These halons have proven to be extremely effective fire suppressants, which are clean (leave no residue) and are remarkably safe for human exposure.

However, a compound's ability to destroy ozone depends on many factors, including the amount of chlorine and/or bromine that it contains. On a relative scale referred to as the ozone depletion potential (ODP), common refrigerants, such as freon, found in refrigerators and air conditioners have a value of 1. On the other hand, Halon 1301 has a value of 10 to 16. That is, Halon 1301 has 10-16 times more potential for destroying the ozone layer.

Unlike aluminum cans or newspapers, once halon is released it is virtually impossible to recover. If halon is still contained in cylinders retired from service or if a container is leaking, the halon can be recovered for reuse. As a result, current legislation prohibits the production or importation of new Halon 1211, 1301, or 2402 into the United States. Recycled halon is now the only source of supply for critical end users such as the Department of Defense, the aircraft industry, the computer industry and the oil pipeline companies. For this reason, there is a need to provide an apparatus and method for the capturing of halocarbon compositions from containers for recycling and reuse.

SUMMARY OF THE INVENTION

In view of the foregoing, it is an object of the invention to provide an apparatus and method for the capturing of halocarbon compositions from containers for recycling and reuse. In the preferred apparatus of the invention, the apparatus comprises a base comprising a top plate, a bottom plate and opposing side plates and having a front end and a rear end, a support column comprising a back plate and opposing side plates is attached substantially perpendicular to the base, a support plate capable of receiving and supporting the container and having a front end and a rear end pivotally attached to the base, a clamping device capable of clamping the container slidably attached to the back plate of the support column, a piercing device capable of forming an opening in the portable container mounted to the rear end of the support plate by using a seal plate and a seal, a tilting device capable of tilting the support plate attached to the front end of the base and attached to the front end of the support plate, and a controller for controlling the clamping device, the piercing device and the tilting device.

In the preferred method of the invention, the method comprises the steps of positioning the portable container on a support plate, clamping the portable container and forming an opening in the portable container while the portable container is being clamped. The halocarbon compositions are removed through the opening formed in the portable container and are captured for recycling.

These and other aspects and advantages of the invention are described or apparent from the following detailed description of the preferred embodiments and appended drawings wherein like reference numbers refer to the same element, feature or component.

BRIEF DESCRIPTION OF THE DRAWINGS

The preferred embodiments are described with reference to the drawings in which.

DETAILED DESCRIPTION OF THE PREFERRED EMBODIMENTS

Figure 1:
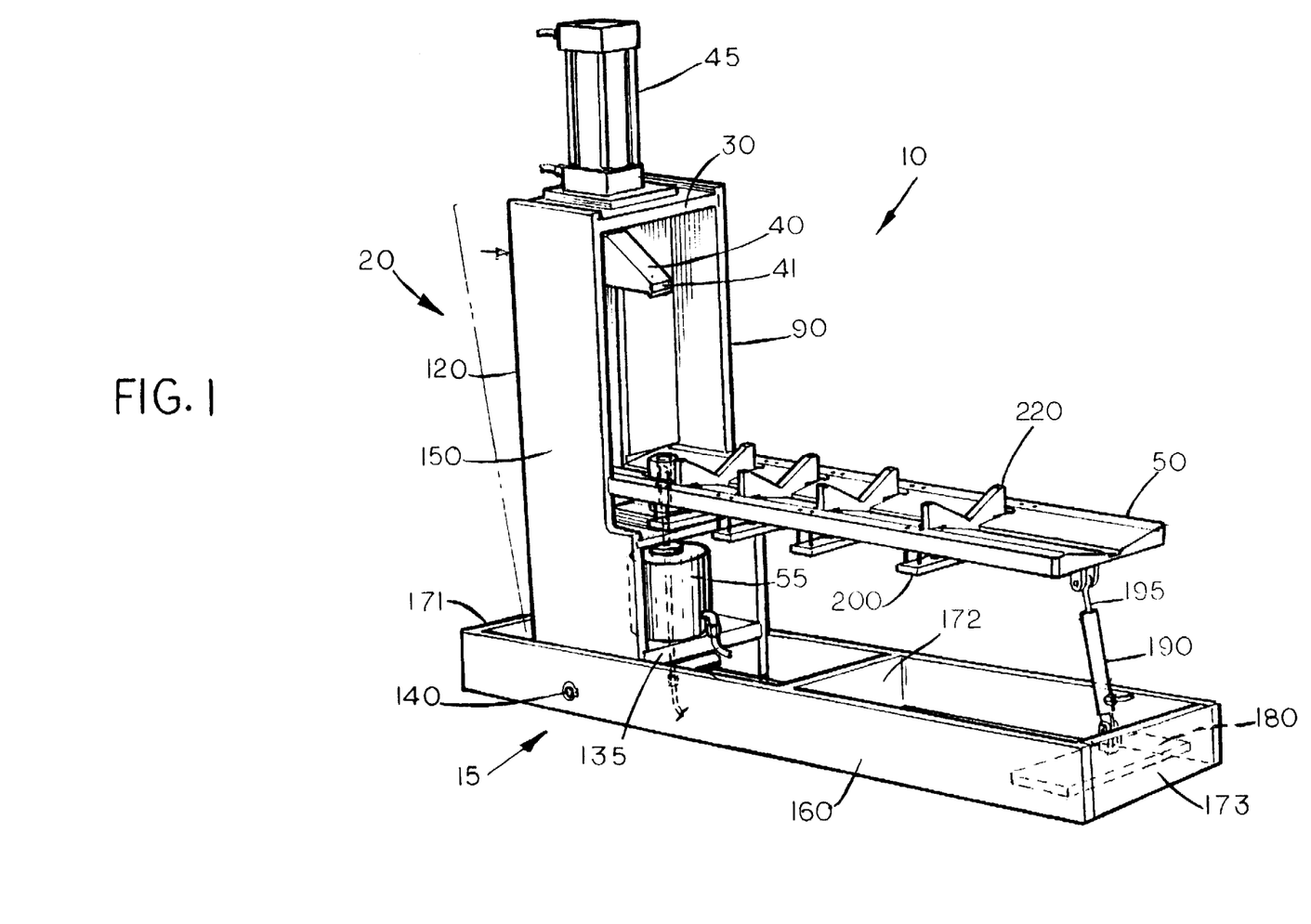
FIG. 1 shows a side perspective view of the apparatus according to a preferred embodiment of the invention.

FIG. 1 shows a side perspective view of an apparatus 10 for capturing halocarbon compositions from containers according to a preferred embodiment of the invention.

The apparatus 10 according to a preferred embodiment of the invention comprises a base 15 having a front end and a rear end. The base 15 includes a front plate 173, a back plate 171 and opposing side plates 160. The base is formed by attaching each side plate 160 to the front plate 173 and back plate 171. The base 15 may include a spreader bar 172 for maintaining the distance between each side plate 160 and for supporting the base 15.

The apparatus 10 also comprises a support column 20 comprising a back plate 120, a top plate 30 and opposing side plates 90, 150. The support column 20 is formed by attaching each side plate 90, 150 to the back plate 120 and top plate 30. The support column 20 is pivotally attached to the base 15 such that the support column 20 is substantially perpendicular to the base 15 when in an upright position. The support column 20 is pivotally attached to the base 15 by using a pivot shaft 40 extending through the opposing side plates of the base and extending through the opposing side plates of the support column.

Figures 2, 3:
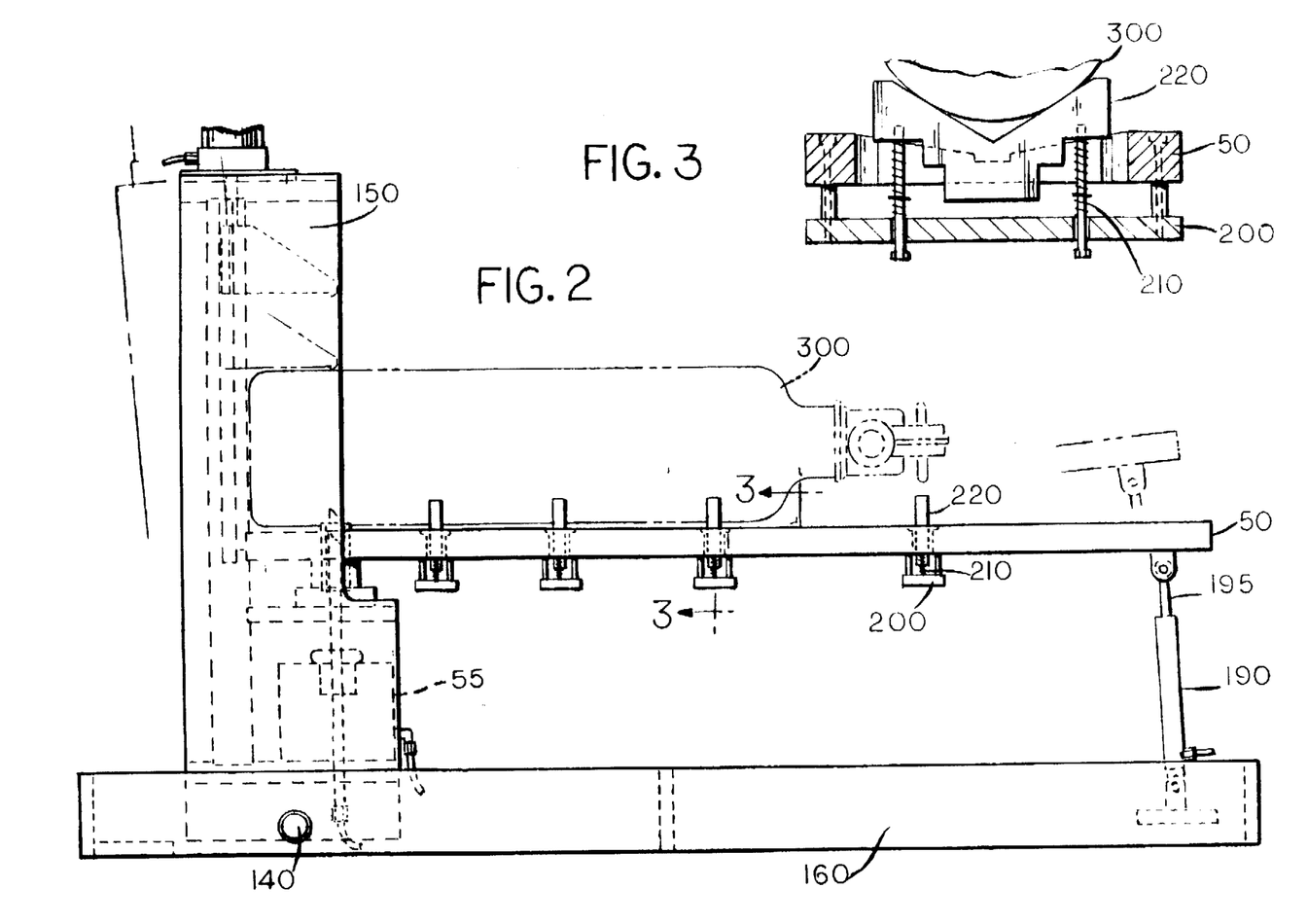
FIG. 2 shows a side view of the apparatus according to the preferred embodiment of the invention.
FIG. 3 shows the spring-loaded guide blocks and guide plates mounted on the support plate along lines 3—3 of FIG. 2.

The apparatus 10 further comprises a support plate 50 for supporting a container 300 (FIG. 3). In the preferred embodiment, the container 300 is a portable fire extinguisher. The support plate or container support includes a front end and a rear end attached to the support column 20. The support plate 50 is preferably attached to the support column 20 by using cap screws (not shown). Preferably, the support plate 50 is received in grooves formed in the opposing side plates 90, 150 and back plate 120 of the support column 20 to hold the support plate 50 firmly in place. The support plate 50 also includes a plurality of guide blocks 220 spring-mounted on spring guide plates 200 using springs 210 (See FIG. 2). The guide blocks 220 are generally V-shaped to better conform to the shape of the container 300.

Figure 4:
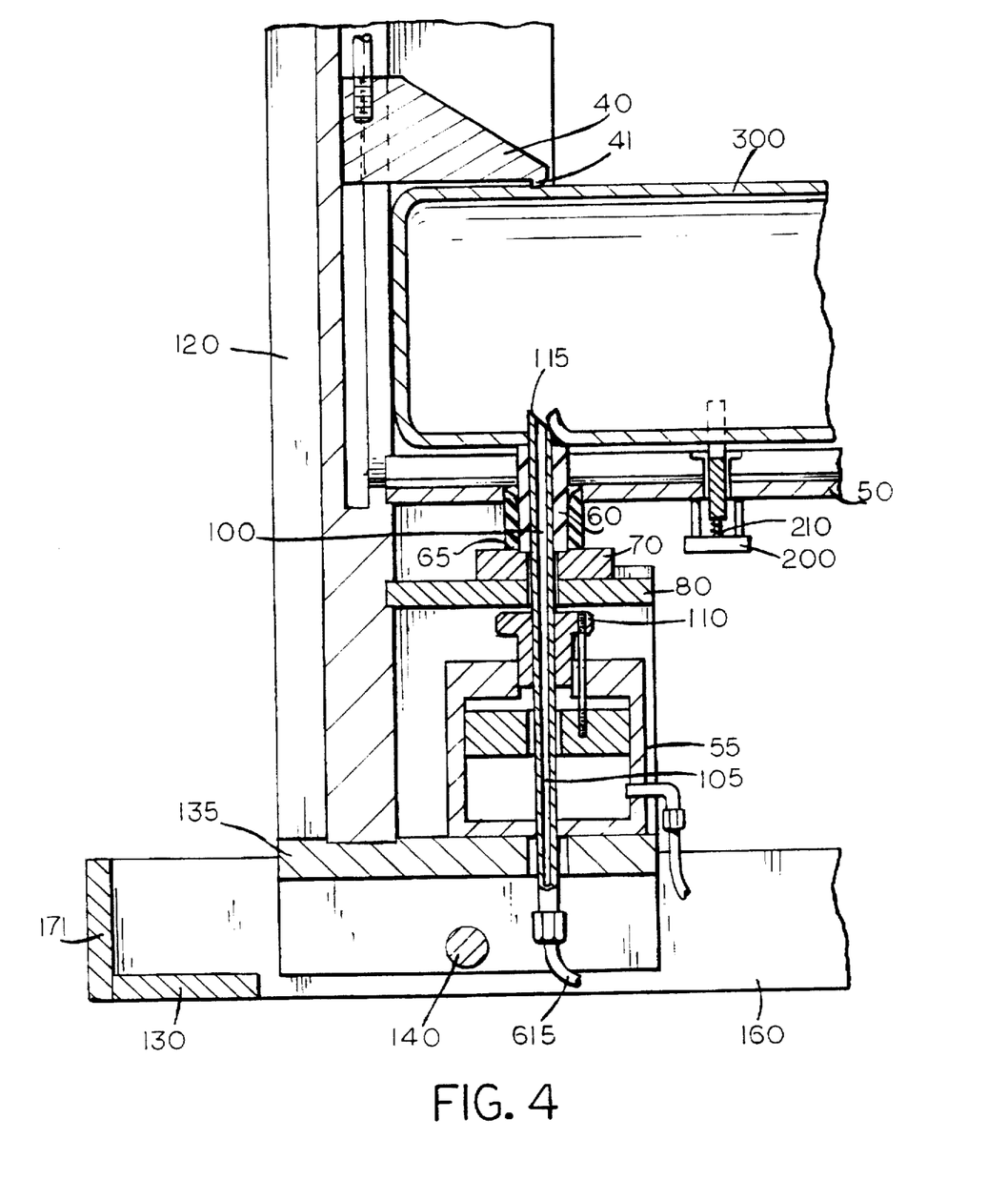
FIG. 4 shows a partial cut-away side view of the preferred embodiment of the invention.
Figure 5:
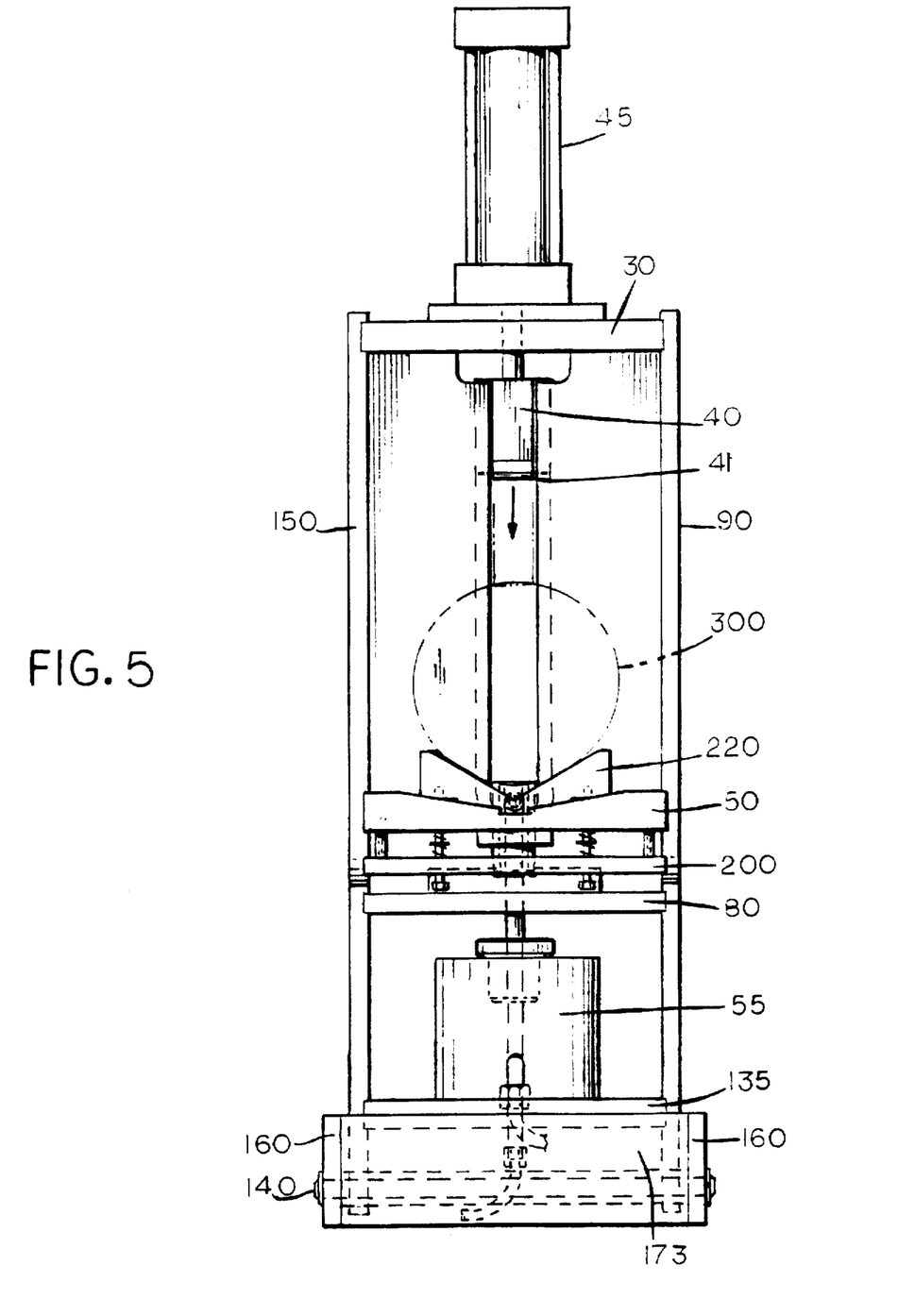
FIG. 5 shows an end view of the preferred embodiment of the invention.

The apparatus 10 also includes a clamping device for clamping the container 300. In the preferred embodiment, the clamping device comprises a clamping foot 40 slidably attached to the back plate 120 of the support column 20. The clamping foot 40 includes a protruding end portion 41 for clamping the container 300 (FIG. 4). The clamping foot 40 is driven by a hydraulic cylinder 45 that causes the clamping foot 40 to move up and down the support column 20 in a vertical direction with respect to the support plate 50. In the preferred embodiment, the clamping foot 40 is capable of exerting approximately 6000–12000 pounds of force on the container to hold the container firmly in place.

The apparatus 10 also comprises a piercing device capable of forming an opening in the container 300. In the preferred embodiment, the piercing device comprises a piercing tool 100 located towards the rear end of the support plate 50 (FIG. 4). However, one skilled in the art can appreciate that the invention is not limited by the location of the piercing device and that the piercing device can be located anywhere along the support plate 50 in order to form an opening in the container 300. To provide long wear characteristics, the piercing tool 100 is preferably made of hardened steel.

The piercing tool 100 is disposed within a seal 60, preferably made of elastomeric material. The seal is disposed within a seal support sleeve 65 that supports the seal 60. The seal 60 and seal support sleeve 65 are mounted on a seal plate 70. The seal plate 70 is mounted on a plate 80 attached to the back plate 120 and side plates 90, 150 of the support column 20. The piercing tool 100 is driven by a hydraulic cylinder 55 that causes the piercing tool 100 to move up and down in a vertical direction with respect to the support plate 50. The hydraulic cylinder 55 is mounted on a mounting plate 135 attached to the back plate and side plates 90, 150 of the support column 20. The piercing tool 100 is held in place by a piercing tool holder 110 mounted on the hydraulic cylinder 55.

In the preferred embodiment, the piercing tool 100 is capable of exerting approximately 12000 pounds of force on the container to form an opening in the container. To minimize deformation to the container 300 when piercing the opening, an end of the piercing tool 100 if formed with a knife edge 115 having an angle of approximately forty-five degrees. However, it should be appreciated by those skilled in the art that the invention is not limited by the angle of the knife edge and that other angles and other knife edge configurations, such as a double-edged knife edge or any other shape that would minimize deformation of the container, are within the scope of the invention.

It is envisioned that the piercing tool 100 may comprise at least two portions having different material characteristics. For example, the piercing tool 100 may comprise an end portion having a knife edge made of hardened steel and a tapered portion made of non-hardened steel. It should be appreciated by those skilled in the art that other material characteristic configurations for the piercing tool 100 are within the scope of the invention.

The apparatus 10 also includes a tilting means or tilting device mounted on a mounting bar located at the front end of the base 15 and connected to the front end of the support plate 50. The tilting means or tilting device tilts the support plate 50, column support 20 and piercing tool 100 while the container 300 is held firmly in place by the clamping device 40. In the preferred embodiment, the tilting means or device comprises a pneumatic or air-operated cylinder 190 capable of lifting approximately 40–50 pounds. The cylinder 190 is attached to a cylinder bar 180 located at the front end of the base 15 and attached to the front end of the support plate 50. In this manner, the cylinder 190 is interposed between the support plate 50 and the base 15. However, it should be appreciated by those skilled in the art that the invention is not limited to a pneumatic cylinder and other well-known tilting means, such as, a hydraulic cylinder or a motor-driven tooth arrangement, are within the scope of the invention.

Figure 6:
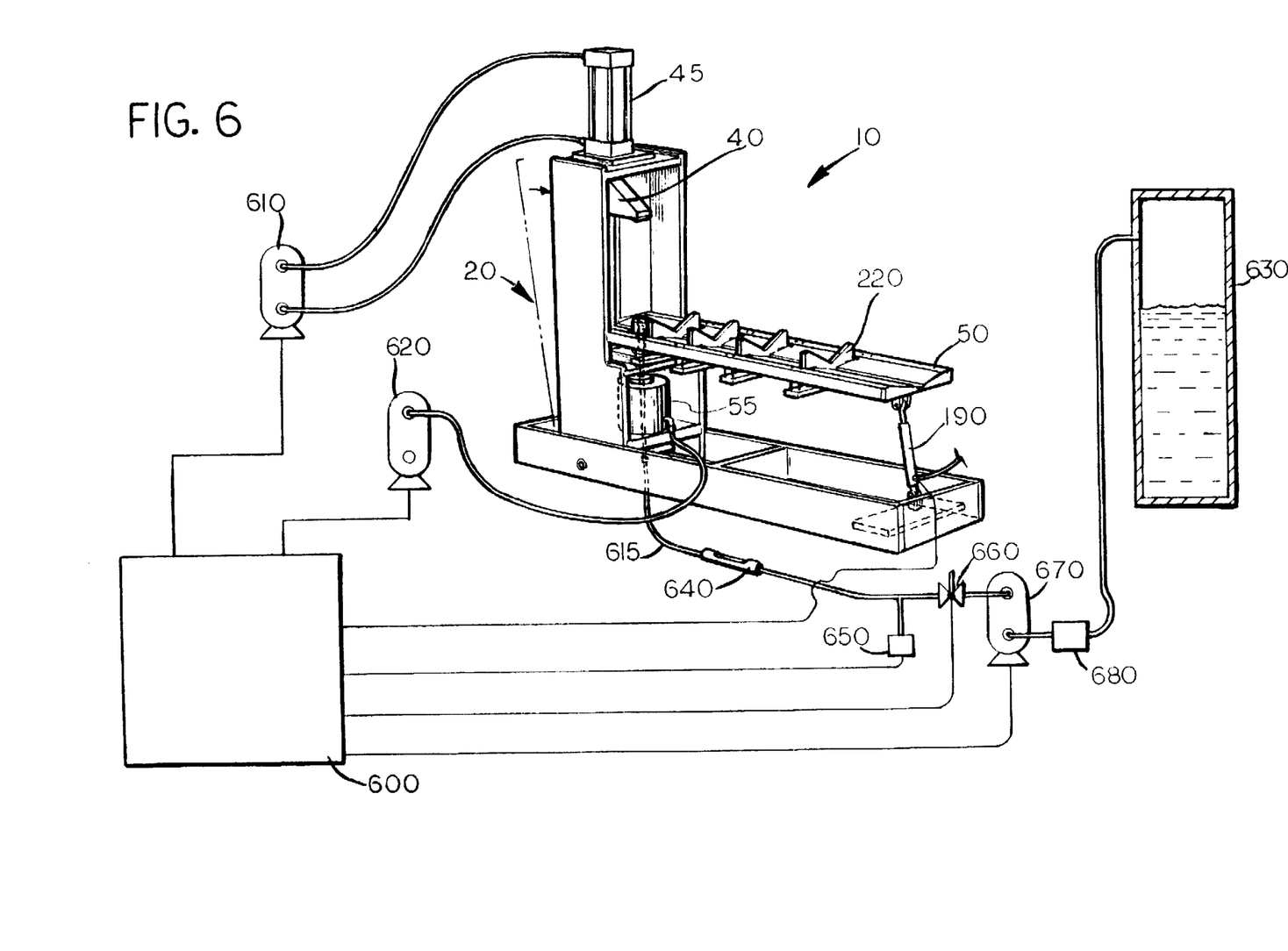
FIG. 6 shows block diagram of the system according to a preferred embodiment of the invention.

The apparatus 10 also includes a means for controlling the securing mechanism, the piercing device and the tilting means (See FIG. 6). In the preferred embodiment, a controller 600 is implemented using a suitably programmed general purpose computer, for example, a microprocessor, microcontroller or other processing device (CPU or MPU), either alone or in conjunction with one or more peripheral data and signal processing devices. However, the controller 600 can also be implemented as a special purpose circuit having a main or central processor section for overall, system-level control, and separate sections dedicated to performing various different specific computations, functions and other processes under control of the central processing section. It will be appreciated by those skilled in the art that the controller also can be implemented using a plurality of separate dedicated or programmable integrated or other electronic circuits or devices, for example, hardwired electronic or logic circuits such as discrete element circuits, or programmable logic devices such as PLDs, PLAs and PALs.

When the controller 600 sends a first signal for the clamping foot 40 to engage the container 300, the hydraulic pump 610 turns on and the hydraulic cylinder 45 causes the clamping foot 40 to move downward towards the container 300 and away from the top plate 30 until the clamping foot 40 engages the container 300. The hydraulic pump 610 may be connected to a hydraulic fluid supply (not shown) that is well known by those skilled in the art. In the preferred embodiment, the hydraulic pressure of the clamping foot 40 is set to a predetermined amount of approximately 6000–12000 pounds of force. The clamping foot 40 will travel until the container 300 exerts the predetermined amount of pressure against the clamping foot 40. The amount of force exerted by the clamping foot 40 against the container 300 can be varied by the controller 600. In doing so, the clamping foot 40 firmly holds the container 300 in place without compromising the integrity of the container 300.

However, it is envisioned that a safety feature may be incorporated into the preferred embodiment of the invention that determines the amount of movement of the clamping foot 40 after the clamping foot 40 has engaged the container 300. The amount of movement of the clamping foot 40 can be measured by any well known means in the art. In this alternative embodiment of the invention, if the clamping foot 40 has travelled a predetermined distance after engaging the container 300, then the controller 600 will send a signal to the hydraulic cylinder 45 to stop the movement of the clamping foot 40. In this manner, the clamping foot 40 will also not compromise the integrity of the container 300.

Similarly, when the controller 600 sends a second signal for the clamping foot 40 to disengage the container 300, a hydraulic pump 610 turns on and the hydraulic cylinder 45 causes the clamping foot 40 to move upward away from the container 300 and towards the top plate 30 until the clamping foot 40 disengages the container 300. Once the clamping foot 40 has disengaged the container 300, the container 300 can be lifted and removed from the apparatus 10. If the next container is much larger in diameter than the previous container, then the controller 600, through operator action, can raise the clamping foot 40 to the proper elevation above the support plate 50 so that the next container can be placed on the support plate 50.

Similarly, when the controller sends a signal to the piercing tool 100 to form an opening in the container 300, a hydraulic pump 620 turns on and the hydraulic cylinder 55 causes the piercing tool 100 to move towards the container 300 while the container 300 is held firmly in place by the clamping foot 40. It should be understood by those skilled in the art that the same hydraulic supply means and the same hydraulic pump can be used for the piercing tool 100 as for the clamping foot 40. The piercing tool 100 continues to move until the piercing tool 100 forms an opening in the container 300 while the seal 60 is compressed against the container 300, thereby preventing the escaping of halocarbon composition into the surrounding atmosphere. At this point, the piercing tool 100 can be retracted by a spring (not shown) into the seal 60 to create a maximum flow opening for the halocarbon composition (FIG. 4). The piercing tool 100 includes an opening or hollow passage 105 for allowing the halocarbon composition to flow from the container 300 into a storage tank 630.

In the preferred embodiment, an end of the piercing tool 100 is connected to a flexible hose 615 with a visual indicator 640, typically a site glass, that provides visual information to the operator that the halocarbon composition is being removed from the container 300. A pressure transducer 650 is located downstream of the visual indicator 640 for providing pressure information to the controller 600. In addition, a solenoid valve 660 is positioned downstream of the pressure transducer 650 as a flow control means to a pump 670 that facilitates the removal of the halocarbon composition from the container 300. The pump 670 causes the halocarbon composition to pass through a filter 680 and to be stored in the storage tank 630. The halocarbon composition stored in the storage tank 630 can then be recovered and the non-condensing gases separated from the halocarbon composition using a system and method as described in commonly assigned, copending application Ser. No. 08/670,012.

When the controller 600 sends a first signal to the cylinder 190 to tilt the support plate 50, column support 20 and piercing tool 100, the shaft 195 of the cylinder 190 extends and moves the support plate 50 from a first position to a second position. In the preferred embodiment, the first position is substantially horizontal to the base 15 and the second position is at a relative angle of approximately five degrees with respect to the first position. It should be appreciated by those skilled in the art that the invention is not limited by the angle at which the support plate is being tilted and that other relative angles are within the scope of the invention.

Likewise, when the controller 600 sends a second signal to the cylinder 190, the shaft 195 of the cylinder 190 retracts into the cylinder 190 and moves the support plate 50, column support 20 and piercing tool 100 from the second position to the first position. The first and second signals are sent to the cylinder 190 while the clamping foot 40 is holding the container 300 firmly in place and after the piercing tool 100 has formed an opening in the container 300, that is, during removal of the halocarbon composition from the container 300 as described below. In this manner, the cylinder 190 causes the support column 20, piercing tool 100 and support plate 50 with the container 300 supported thereon to move in a reciprocating or a rocking manner between the first and second position, thereby causing an agitating action that agitates the halocarbon composition within the container 300. This agitating action during removal of the halocarbon composition facilitates the removal of the halocarbon composition from the container 300.

A preferred embodiment of a method for capturing halocarbon compositions from containers using the preferred embodiment of the apparatus of the invention will now be described.

In the preferred embodiment, the container 300 comprises a portable fire extinguisher and the halocarbon composition to be captured and recycled is Halon 1211. It should be understood that the container may be any container that can be supported by the support plate 50 and the halocarbon composition can be any halocarbon composition used for fire prevention.

First, the portable fire extinguisher may be weighed by the operator to determine the weight of the fire extinguisher with the Halon 1211 contained therein.

Next, the operator places the fire extinguisher on the support plate 50 such that the bottom of the fire extinguisher is adjacent the back plate 120 of the support column 20 (FIG. 2). In other words, the bottom of the fire extinguisher is placed at the rear end of the support plate 50 and the front or nozzle portion of the fire extinguisher is placed at the front end of the support plate 50. At this point, the fire extinguisher is supported slightly above the support plate 50 and the seal 60 by the spring-loaded guide blocks 220.

Then, the operator depresses a manual switch (not shown) connected to the controller 600 that sends a signal to the controller 600. The controller 600 acknowledges the signal and sends a signal to the hydraulic pump 610 to turn on. The hydraulic pump 610 causes the hydraulic cylinder 45 to move the clamping foot 40 from above the fire extinguisher downward towards the fire extinguisher. As the clamping foot 40 engages the fire extinguisher, the clamping foot 40 continues to move downward and begins to depress the spring-loaded guide blocks 220. As the clamping foot 40 continues to move downward, the seal 60 engages the fire extinguisher. The clamping foot 40 continues to move downward until the seal 60 is compressed against the fire extinguisher forming a tight seal while the fire extinguisher is held firmly in place against the support plate 50 by the clamping foot 40. It should be understood by those skilled in the art that the invention is not limited by the manual switch and that the invention can be practiced by other switches, such as automatic switches, as well as, by depressing buttons on a keyboard device connected to the controller or a general purpose computer.

While the fire extinguisher is being held firmly in place by the clamping foot 40, the controller 600 sends a signal to the hydraulic pump 620 to turn on. Then, the hydraulic cylinder 55 moves the piercing tool 100 towards the fire extinguisher until the piercing tool 100 forms an opening in the fire extinguisher. After the opening is formed, the piercing tool 100 may retract into the seal 60 to provide a maximum flow area for the Halon 1211 leaving the fire extinguisher. Because the internal pressure of the fire extinguisher is higher than the operating pressure of the apparatus 10, typically atmospheric pressure, the Halon 1211 escapes through the opening formed in the fire extinguisher by travelling through the tube 615 connected to the end of the piercing tool 100. In fact, the higher the internal pressure of the fire extinguisher, the faster the Halon 1211 will leave the fire extinguisher. However, even if the internal pressure of the fire extinguisher is very low with respect to the atmospheric pressure, the pump 670 can be used to facilitate the removal of the Halon 1211 from the fire extinguisher.

At this point, the operator verifies that liquid phase Halon 1211 is traveling through the tube 615 by observing the visual indicator 640 in the tube 615. Should liquid phase Halon 1211 be observed, the operator may actuate the switch sending a signal to the controller 600 that opens the solenoid valve 660 to allow the Halon 1211 to flow through filter 680 and into the storage tank 630. As the Halon 1211 is being removed from the fire extinguisher, the pressure inside the fire extinguisher decreases. When the pressure drops to a predetermined pressure, typically 40-70 psig, the controller 600 automatically sends a signal to the pump 670 to turn on to facilitate removal of the Halon 1211 and automatically sends a signal to the pneumatic cylinder 190 to start rocking the support plate 50, support column 20 and piercing tool 100 to ensure that all the Halon 1211 is removed from the fire extinguisher. When the pressure inside the fire extinguisher drops to a predetermined amount, typically -5 to -10 psig (10-20 in-Hg), the controller 600 automatically sends a signal to the pump 670 to turn off and automatically sends a signal to the pneumatic cylinder 190 to stop rocking the support plate 50, support column 20 and piercing tool 100. The Halon 1211 stored in the storage tank 630 can then be recovered and the non-condensing gases separated from the Halon 1211 using a system and method as described in commonly assigned copending application Ser. No. 08/670,012.

Once the Halon 1211 has completely transferred into the storage tank 630 as verified by the absence of Halon 1211 being observed by the operator by looking at the visual indicator 640, the operator depresses the manual switch that sends a signal to the controller 600. The controller acknowledges the signal and sends a signal to the hydraulic pump 610 causing the hydraulic cylinder 45 to raise the clamping foot 40 upward towards the top of the support column 20. The clamping foot 40 stops moving when it has disengaged the fire extinguisher.

At this point, the operator removes the fire extinguisher from the support plate 50. Then, the operator weighs the fire extinguisher to determine the weight of the fire extinguisher. In this way, the operator can compare the weight measured earlier with the weight after removing the fire extinguisher to determine the amount of Halon 1211 actually removed from the fire extinguisher.

It should be appreciated that the invention is not limited to capturing the halocarbon compositions mentioned above and that the invention can be practiced to capture any gases contained within containers.

While this invention has been described in conjunction with specific embodiments, it is evident that many alternatives, modifications and variations will be apparent to those skilled in the art. Accordingly, the preferred embodiments of the invention as set forth herein are intended to be illustrative, rather than limiting. Various changes may be made without departing from the spirit and scope of the invention as defined in the following claims.

What is claimed is:

1. An apparatus for capturing halocarbon compositions from portable containers, comprising:

a base having a front end and a rear end, said base comprising a top plate, a bottom plate and opposing side plates, each side plate being attached to the top and bottom plates to form said base;

a support column pivotally attached to said base by using a pivot shaft extending through the opposing side plates of said base and extending through the opposing side plates of said support column, said support column comprising a back plate, a top plate and opposing side plates, each side plate being attached to the back plate and the top plate to form said support column;

a support plate having a front end and a rear end, the rear end being attached to said support column, said support plate including a plurality of spring-loaded guide blocks mounted on spring guide plates, said support plate capable of receiving and supporting at least one portable container;

a hydraulic clamping device slidably attached to the back plate of said support column, said clamping device capable of clamping at least one portable container;

a hydraulic piercing device disposed within a seal mounted to a seal plate located at the rear end of said support plate, said piercing device capable of forming an opening in at least one portable container;

a pneumatic cylinder interposed between the front end of said base and the front end of said support plate, said pneumatic cylinder capable of tilting said column support, said piercing device and said support plate in a reciprocating manner while at least one portable container is being clamped by said clamping foot; and a controller for controlling said clamping device, said piercing device and said pneumatic cylinder.

2. An apparatus for capturing halocarbon compositions from portable containers for recycling according to claim 1, wherein said piercing device is connected to a tube having a visual indicator for indicating removal of the halocarbon composition.

3. An apparatus for capturing halocarbon compositions from portable containers for recycling according to claim 2, wherein said tube is connected to a pump for facilitating removal of the halocarbon composition from at least one portable container when an internal pressure within at least one portable container falls to a predetermined pressure while the halocarbon composition is being captured.

4. An apparatus for capturing halocarbon compositions from portable containers for recycling according to claim 3, wherein said pump is connected to a filter for filtering the halocarbon composition before the halocarbon composition is stored in a storage tank.

5. An apparatus for capturing halocarbon compositions from portable containers for recycling according to claim 1, wherein said at least one portable container comprises a fire extinguisher.

6. An apparatus for removing a substance from a container, comprising:
- a base;
- a support column pivotally attached to said base, said support column including a securing mechanism for securing the container to a container support attached to said support column;
- a seal mounted to said support column, said seal adapted to engage the container when said securing mechanism is securing the container to the container support;
- a piercing device disposed within said seal and capable of forming an opening in the container, said piercing device having a hollow passage for allowing the substance to flow from the container; and
- means for tilting said support column and the container support supporting the container while the container is being secured by said securing mechanism,
- wherein the substance is removed from the container without escaping into the surrounding atmosphere when said piercing device forms an opening in the container.

7. An apparatus for removing a substance from a container according to claim 6, further comprising a controller for controlling said piercing device, said tilting means and said securing mechanism.

8. An apparatus for removing a substance from a container according to claim 6, wherein said seal is disposed within a seal support sleeve mounted on the seal plate.

9. An apparatus for removing a substance from a container according to claim 6, wherein said support column is pivotally attached to said base using a pivot shaft extending through said base and said support column.

10. An apparatus for removing a substance from a container according to claim 6, wherein said securing mechanism comprises a hydraulic clamping foot slidably attached to said support column.

11. An apparatus for removing a substance from a container according to claim 6, wherein said tilting means comprises a pneumatic cylinder interposed between said base and the container support.

12. An apparatus for removing a substance from a container according to claim 6, wherein said piercing device comprises a hydraulically driven piercing tool.

13. An apparatus for removing a substance from a container according to claim 6, wherein said container comprises a portable fire extinguisher containing a halocarbon composition.

14. An apparatus for removing a substance from a container according to claim 13, wherein the halocarbon composition comprises Halon 1211.

15. A method for removing a substance from a container, comprising the steps of:
- positioning the container on a support plate;
- securing the container to the support plate;
- forming a seal on the container while the container is being secured to the support plate;
- forming an opening in the container using a piercing tool disposed within said seal and having a hollow passage for allowing the substance to pass therethrough while the container is being secured,
- whereby the substance is removed through the opening formed in the container without escaping into the surrounding atmosphere and is captured in a storage tank for recycling.

16. A method for removing a substance from a container according to claim 15, further comprising the steps of pumping the substance from the container and rocking the support plate supporting the container when an internal pressure of the container falls below a predetermined amount.

17. A method for removing a substance from a container according to claim 15, further comprising the steps of weighing the container before and after the substance is removed to determine an actual amount of the substance removed from the container.

18. A method for removing a substance from a container according to claim 15, further comprising the step of filtering the substance before the substance is captured in the storage tank.

19. A method for removing a substance from a container according to claim 15, wherein the substance comprises a halocarbon composition.

\* \* \* \* \*